United States Patent Office 2,963,346
Patented Dec. 6, 1960

2,963,346

METHOD OF PREPARING MANGANESE CARBONYL

George G. Ecke, Ferndale, Mich., assignor to Ethyl Corporation, New York, N.Y., a corporation of Delaware No Drawing. Filed Nov. 22, 1957, Ser. No. 698,075

11 Claims. (Cl. 23—203)

This invention relates to a process for the preparation of manganese carbonyl.

Until recently, the compound manganese carbonyl was not known to exist. Publications, however, now describe several processes for the preparation of this compound including a process involving the reduction of manganous iodide with a Grignard reagent under pressure of carbon monoxide. This process was reported to yield a mixture of products in which the presence of manganese was indicated by peaks observed by mass spectrometric analysis. However, no apparent peak was observed for the compound corresponding to $[Mn(CO)_5]_2$, which is believed to be the formula of manganese carbonyl, so that the presence of this compound in the product was not established. Further characterization of the product could not be carried out because of the minute quantity of material obtained. More recently it has been shown that manganese carbonyl can be produced in up to about nine percent yields by the use of a phenyl Grignard reagent when the Grignard is mixed with a manganous halide under carefully controlled conditions. However, even this process can supply only limited experimental quantities of the very valuable and useful manganese carbonyl.

It is, therefore, an object of this invention to provide an improved method for the preparation of manganese carbonyl. A further object is to provide a method for the synthesis of manganese carbonyl in improved yields. It is also an object to provide an improved Grignard method for the synthesis of manganese carbonyl. Other objects of this invention will become apparent from the description which follows.

According to the present invention, manganese carbonyl is prepared by reacting an intermediate prepared from a manganous halide and a benzyl Grignard under pressure of carbon monoxide. The reaction is ordinarily conducted in the presence of an ether which serves as carrier and solvent for the Grignard reagent. The alkyl ethers and cyclic ethers, such as tetrahydrofuran and the like, are particularly adapted to the process of this invention. The reaction is conveniently conducted under maximum carbon monoxide pressures ranging from about 300 pounds per square inch, and at temperatures ranging from about 100° C. to about 200° C. It is found that excellent results are obtained when the benzyl Grignard and manganese halide are contacted with carbon monoxide for periods ranging from a few minutes to 40 hours or longer, 30 minutes to 10 hours representing a preferred contacting time range.

This invention is conveniently carried out by forming an intermediate complex by mixing a benzyl Grignard and a manganous halide and subsequently treating this intermediate with carbon monoxide. In conducting the process of this invention, it is not necessary to contact the Grignard-manganous halide intermediate with carbon monoxide at unusually low temperatures since excellent results are obtained when the carbon monoxide first comes into contact with the intermediate at room temperature or slightly above.

A preferred embodiment of the present invention is a process for the preparation of manganese carbonyl comprising reacting benzyl magnesium chloride with manganous chloride in tetrahydrofuran and subsequently reacting the resulting intermediate with carbon monoxide at pressures up to 10,000 pounds per square inch at a temperature of from 100 to 200° C. for from about two to about 10 hours. It has been found that good yields of manganese carbonyl are obtained in this manner even when the Grignard is reacted with manganous salt at temperatures up to about 70° C., however, best results are obtained when the mixture is kept at below about 40° C. prior to carbonylation.

The present invention possesses the advantage of greatly increasing yield over any prior Grignard method of synthesizing manganese carbonyl. This is evidenced by the fact that Grignard methods previously employed resulted in yields of at best about nine percent, whereas yields well in excess of this figure are obtained by the practice of the present invention.

When conducting the process of this invention, the product manganese carbonyl is separated from the reaction mixture by such conventional methods as fractional distillation, sublimation, and steam distillation. Pure manganese carbonyl exists as a dimer having the formula $[Mn(CO)_5]_2$ and has a melting point of about 155° C. The compound crystallizes into characteristic yellow crystals. The compound is essentially insoluble in water. It is, however, soluble in liquid hydrocarbons and is particularly soluble in acetone.

The novel method of the present invention will become more apparent by consideration of the following specific examples in which all parts are by weight unless otherwise stated.

*Example 1*

Into a cool reaction vessel equipped with heating and cooling means, reagent inlet means, means for agitation and a temperature measuring device was placed 135 parts of benzyl magnesium chloride contained in about 700 parts of tetrahydrofuran. The Grignard was maintained at 0° C. and 57 parts of anhydrous manganous chloride was added with agitation. The mixture remained under agitation without cooling for a period of seven hours after which time the temperature had risen to 28° C. It was then warmed to 35° C. and allowed to remain overnight at this temperature.

The intermediate was then transferred to a pressure resistant vessel equipped with temperature measuring device, gas and liquid inlet and discharge means and means for agitation. This vessel was sealed and pressurized with carbon monoxide to an initial pressure of 3000 p.s.i. at 35° C. The contents, while under agitation, were heated over a three-hour period to a temperature of about 170° C. and a resultant pressure of about 4600 p.s.i. These conditions were maintained for an additional one and one-half hour period during which time a maximum temperature of 172° and a minimum pressure of 4550 p.s.i. were achieved. The vessel was then cooled to room temperature, the excess carbon monoxide was vented and the contents of the vessel were discharged. The liquid reaction mass was distilled to remove the solvent, this being the portion which distills below 70° C. The remainder of the material was then subjected to steam distillation and then extracted with ether. The ether was evaporated to give a yellow crystalline solid product, manganese carbonyl. The solids remaining in the distillation flask were acidified and treated with ether and again steam distilled. The solids recovered from this distillation were added to the solids obtained above. These total solids amount to 16.2 parts of yellow crystals of manganese pentacarbonyl, melting at about 155°.

This represents an 18.5 percent yield of this valuable product.

*Example II*

In a reaction vessel equipped with stirring means, heating means and inlet means for liquid, solid and gaseous materials was placed 162 parts of magnesium turnings and 1320 parts of tetrahydrofuran. Nine hundred and twenty-four parts of benzyl chloride dissolved in an additional 2900 parts of tetrahydrofuran were added slowly over a two-hour period while the temperature in the vessel was maintained at 40° C. and the contents were kept under a blanket of nitrogen for a period in excess of four hours. An aliquot of the solution was hydrolyzed and titrated with standard acid. The titration demonstrated that 48 percent of the benzyl chloride was converted to benzyl magnesium chloride. To this resulting Grignard reagent was added 212 parts of anhydrous manganous chloride. A green solution was thus formed which was sensitive to air oxidation and therefore maintained under nitrogen. The mixture was refluxed for one-half hour. The resulting intermediate was transferred to a pressure resistant vessel equipped with a temperature measuring device, gas inlet and outlet means, means for agitation, heating means and means for adding reagents under pressure. The vessel was flushed with nitrogen, sealed and pressurized with carbon monoxide while the contents were heated and kept under agitation. The carbonylation was conducted at 160° C. under 3000 pounds per square inch pressure for four hours. The vessel was then cooled, the excess carbon monoxide vented. The resulting solution was transferred to a steam distillation apparatus and steam distilled from the portion distilling below 80° C., which contained the solvent tetrahydrofuran, 22 parts of manganese carbonyl were obtained by adding benzene and boiling off the ether. An additional 23 parts were obtained from the part distilling over 80° C. by extracting the distillate with benzene and reducing the volume of solution by evaporation followed by filtration. The product has a melting point of 153 to 154° C. The total yield represents a 15.3 percent conversion based on the amount of manganous chloride charged.

*Example III*

To a one-mole quantity of 1.23 N benzyl Grignard in tetrahydrofuran was added 0.5 mole of anhydrous manganous chloride in a nitrogen atmosphere. This mixture was agitated while in the nitrogen atmosphere for 30 minutes. After three hours, it was charged to a pressure resistant vessel which was then sealed, pressurized with 2800 p.s.i. of carbon monoxide and heated at 150° for one hour. The resulting product was steam distilled to remove the tetrahydrofuran and ether washings which were added to facilitate removal from the pressure vessel. The manganese carbonyl was extracted from the remaining portion with benzene and the benzene partly removed by subjecting a flask in a hot water bath to vacuum. Filtering then gave better than a 10 percent yield of manganese carbonyl with a melting range of 151–155° C.

*Example IV*

The procedure in Example I was repeated except that the manganous chloride and benzyl Grignard were admixed at −20° C. and were maintained at below −10° C. when charged to the pressure resistant vessel. The carbon monoxide was charged to the pressure resistant vessel at this low temperature and the reaction mass was then heated to about 172° C. and 4600 p.s.i. The workup procedure was identical with that of Example I and an excellent amount of manganese carbonyl (i.e., about 18 percent) was recovered. This example illustrates that no benefit is obtained when the carbon monoxide first comes into contact with the Grignard-manganous halide intermediate at reduced temperatures.

*Example V*

The procedure of Example II is followed using p-ethyl-benzyl magnesium bromide and manganous iodide as the reactants in ethyl ether as a solvent and the mixture is charged to the pressure resistant vessel and carbonylated under 300 p.s.i.g. of carbon monoxide pressure at 200° C. for ten hours. An excellent yield of manganese carbonyl results.

*Example VI*

An intermediate prepared from 270 parts of 3,5-dimethyl-benzyl magnesium iodide and 155 parts of manganese iodide in 575 parts of tetrahydrofuran is reacted with carbon monoxide at a temperature of 160° C. and 10,000 p.s.i.g. for three hours according to the procedure of Example I. Manganese carbonyl in high yield results.

*Example VII*

To a vessel equipped with stirring means, means for charging liquid and solid reagents, means for maintaining the conditions in an inert atmosphere and means for admitting the gaseous reagents through the reaction mass and heating means is charged m-octyl benzyl magnesium bromide and manganous chloride in a ten mole excess of diethylene glycol diethyl ether as a solvent. The temperature is then raised to 100° C. while carbon monoxide is bubbled through the reaction mixture which is kept under constant agitation. The treatment with carbon monoxide is contacted for 40 hours after which time the reaction mass is steam distilled to remove the solvent and separate a good yield of manganese carbonyl.

*Example VIII*

The procedure of Example II is followed using p-phenyl benzyl magnesium bromide and manganese bromide in tetrahydrofuran. The carbonylation is conducted at 150° C. and 3000 p.s.i.g., which conditions are maintained for 15 minutes. An excellent yield of manganese carbonyl results.

The foregoing examples illustrate that the process of this invention can be carried out with a wide range of temperatures. Thus, the carbonylation is effected at final temperatures as low as 100° C. and excellent results are obtained employing temperatures as high as 200° C. or higher. A preferred temperature range is from 150° to 180° C., as it has been found that excellent results are obtained when these temperatures are employed.

The examples also illustrate that a wide range of carbon monoxide pressures are profitably employed in the process of this invention. Thus, pressures ranging from the partial pressure of carbon monoxide produced by bubbling carbon monoxide through the reaction mixture to high pressures in the neighborhood of 10,000 pounds per square inch are employed. However, taking into consideration the construction of reaction equipment, a practical range in which to conduct this process and at carbon monoxide pressures ranging from about 300 pounds to about 5000 pounds per square inch which constitutes an especially preferred range of pressures.

In the carbonylation reaction, carbon monozide absorption continues for many hours, so that the length of time that the reactants should be allowed to remain in contact with one another depends on the degree of completeness of reaction desired and the time economics involved. Since the greater portion of the carbon monoxide which reacts is consumed during the initial portion of the period at reaction temperatures, it is found a time of reaction of about ten hours or less is sufficient. However, longer reaction times of up to 40 hours or more may be employed if desired.

In conducting the process of this invention, it is desirable to continuously agitate the reactants. This agitation may be accomplished by a variety of methods known to those skilled in the art as, for example, stirring, or including a piece of stainless steel in the reaction vessel and rocking the vessel during the reaction period and the like.

Various solvents and diluents compatible with the reactants may be used such as ether, tetrahydrofuran, dioxane, benzene, inert glycol ethers, inert hydrocarbons, nitrogen, argon, and the like, as well as mixtures of various such solvents and/or diluents. Tetrahydrofuran is a preferred solvent, as high yields of product are obtained by its use. In general, an excess of ether solvent of from 7 to 15 moles based on magnesium is profitably employed.

The manganous halide used in this process should be anhydrous since any water present destroys an equivalent amount of Grignard reagent. It was also found preferable that the manganous halide be finely divided in order to expose the maximum surface area for reaction. However, the size of the particles is not critical so that even a granular product may be employed. Another requisite of the manganous halide is that it should be oxygen free in order that higher yields may be obtained.

The carbon monoxide used in the reaction should be substantially free of oxygen, carbon dioxide and water vapor since the presence of water or oxygen in the system tends to reduce the amount of product formed.

Another variant in the present process is to avoid the presence of excess reactive halide compounds when preparing the Grignard reagent. That is, it is preferred to prepare the Grignard using an excess of magnesium. This has the effect of lowering the amount of impurities formed during the reaction, thus permitting a cleaner and less bulky product mixture from which the manganese carbonyl can be more readily separated. To this end, it is desirable to prepare the Grignard reagent so that it contains a minimum of unreacted organic halides.

The benzyl Grignard reagent applicable to the process of this invention is a hydrocarbon magnesium halide in which the magnesium is bonded to a carbon atom, which carbon atom is singly bonded to an adjacent carbon atom which is part of a benzene ring. The benzyl Grignard reagent may contain further substitutions on the aromatic nucleus. Examples of the benzyl Grignard reagents applicable include 2-methyl-benzyl magnesium bromide, 4-phenyl-benzyl magnesium iodide, m-tert-butyl-benzyl magnesium iodide, 2-ethyl-4-hexyl-benzyl magnesium chloride, 1-(p-tert-butyl-phenyl)-1-n-butyl magnesium chloride, and the like. Those having up to 15 carbon atoms are preferred.

As used in the specification, the term "halide" denotes those halides having atomic numbers of at least 17. Thus, the manganous halides applicable are manganous chloride, bromide and iodide. The applicable benzyl Grignards likewise include the chloride, bromide and iodide compounds.

In conducting the process of this invention, the benzyl Grignard reagent can be allowed to react with manganous halide for relatively long periods prior to conducting the carbonylation step. Thus, good yields are obtained when the intermediate is allowed to stand for as much as from 4 to 48 hours prior to carbonylation. However, good results are also obtained when shorter intermediate reaction times are employed.

When appropriate equipment is available, it is desirable to prepare the Grignard-manganous halide intermediate in the same vessel in which carbonylation is to take place, although excellent results are obtained when the intermediate is prepared in a separate vessel and then transferred to the carbonylation apparatus.

The preferred Grignard reagent in the process of this invention is the benzyl magnesium chloride, since it is found that faster reaction rates are obtained in preparing the intermediate when this particular Grignard is employed. However, for small scale laboratory operations, the bromide and iodide also give good results.

The manganese carbonyl produced by the process of the present invention has a variety of uses including use as a chemical intermediate in the synthesis of other compounds and as a source of a highly purified and reactive form of manganese metal which is produced on its decomposition. However, an outstanding utility of manganese carbonyl involves the fact that this compound is an antiknock agent of exceptional potency when added to gasoline for use in spark ignition internal combustion engines. An example of the benefits obtained by the use of manganese carbonyl in gasoline is as follows.

When a quantity of a commercial gasoline had added thereto an amount of manganese carbonyl sufficient to give a composition containing one gram of manganese per gallon, the octane number of the gasoline was increased from 91.8 to 96.2. The gasoline was prepared by adding the requisite quantity of crystalline manganese carbonyl to the gasoline and agitating the mixture until the manganese carbonyl was completely dissolved and thoroughly dispersed. The octane number value of the gasoline both with and without the manganese carbonyl was determined by the Research Method for determining the octane number of a fuel. The Research Method is the generally accepted test method since it gives a good indication of the fuel behavior in full-scale automotive engines under normal driving conditions. It is the method most used by commercial installations in determining the value of a gasoline or additive. The Research Method of testing antiknocks is conducted in a single-cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in Test Procedure D-908-55 contained in the 1956 edition of the "ASTM Manual of Engine Test Methods for Rating Fuels."

Having fully described the nature of the present invention, it is not intended that it be limited except within the spirit and scope of the following claims.

I claim:

1. A process for the preparation of manganese carbonyl which comprises reacting carbon monoxide with an intermediate prepared from reaction of a manganous halide selected from the group consisting of manganous chloride, manganous bromide and manganous iodide with a benzyl Grignard wherein the magnesium atom is bonded to an aliphatic carbon atom which is in turn bonded to a nuclear carbon atom of an aromatic hydrocarbon group and said magnesium atom is also bonded to a halogen selected from the group consisting of chlorine, bromine and iodine.

2. A process for the preparation of manganese carbonyl which comprises reacting in an ether solvent carbon monoxide with an intermediate prepared from the reaction of a manganous halide selected from the group consisting of manganous chloride, manganous bromide and manganous iodide with a benzyl Grignard wherein the magnesium atom is bonded to an aliphatic carbon atom which is in turn bonded to a nuclear carbon atom of an aromatic hydrocarbon group and said magnesium atom is also bonded to a halogen selected from the group consisting of chlorine, bromine and iodine.

3. The process of claim 2 wherein the manganous halide is anhydrous.

4. The process of claim 3 wherein the manganous halide is in a finely divided form.

5. The process of claim 4 wherein the manganous halide is oxygen free.

6. The process of claim 2 wherein the reaction is conducted with agitation.

7. The process of claim 6 wherein the carbon monoxide is substantially free of oxygen, carbon monoxide and water vapor.

8. The process of claim 7 wherein the benzyl Grignard is prepared from excess magnesium.

9. The process of claim 2 where said ether solvent is tetrahydrofuran.

10. The process of claim 2 wherein said benzyl Grignard is benzyl magnesium chloride.

11. A process for the preparation of manganese carbonyl which comprises reacting carbon monoxide at temperatures of 100 to 200° C. and pressures of from about 300 to about 10,000 p.s.i. for from one-half hour to ten hours with an intermediate prepared from manganous chloride and benzyl magnesium chloride in tetrahydrofuran as a solvent.

References Cited in the file of this patent

UNITED STATES PATENTS 2,822,247    Hnizda _____ Feb. 4, 1952

OTHER REFERENCES

Hurd et al.: "Manganese Carbonyl," J. Am. Chem. Soc., 71 (1899), May 1949.

Owen et al.: J. Am. Chem. Soc., 69 (1723–4), 1947.